US010826379B2

(12) United States Patent
Armschat et al.

(10) Patent No.: US 10,826,379 B2
(45) Date of Patent: Nov. 3, 2020

(54) CONVERTER ARRANGEMENT COMPRISING A STAR POINT REACTOR

(71) Applicant: SIEMENS AKTIENGESELLSCHAFT, Munich (DE)

(72) Inventors: Christoph Armschat, Erlangen (DE); Andre Schoen, Erlangen (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 16/349,303

(22) PCT Filed: Nov. 22, 2016

(86) PCT No.: PCT/EP2016/078383
§ 371 (c)(1),
(2) Date: May 13, 2019

(87) PCT Pub. No.: WO2018/095508
PCT Pub. Date: May 31, 2018

(65) Prior Publication Data
US 2020/0186022 A1 Jun. 11, 2020

(51) Int. Cl.
*H02M 1/12* (2006.01)
*H02J 3/01* (2006.01)
(Continued)

(52) U.S. Cl.
CPC .............. *H02M 1/126* (2013.01); *H02J 3/01* (2013.01); *H02J 3/36* (2013.01); *H02M 7/219* (2013.01); *H02M 7/483* (2013.01)

(58) Field of Classification Search
CPC .. H02M 1/12; H02M 2001/123; H02M 1/126; H02M 7/483; H02M 2007/4835; H02M 7/219; H02J 3/01; H02J 3/36
See application file for complete search history.

(56) References Cited

U.S. PATENT DOCUMENTS

| 5,663,636 A | 9/1997 | Faelldin et al. |
| 5,814,901 A * | 9/1998 | Ihara ........................ H02J 3/01 307/105 |

(Continued)

FOREIGN PATENT DOCUMENTS

| CN | 101393465 A | 3/2009 |
| DE | 3337834 A1 | 3/1985 |

(Continued)

OTHER PUBLICATIONS

Bor-Ren Lin et al: "Analysis and operation of hybrid active filter for harmonic elimination", Power Conversion Conference, 2002, PCC-Osaka 2002 Proceedings of the Osaka, Japan Apr. 2-5, 2002, Piscataway, NJ, USA, IEEE, US, vol. 2, Apr. 2, 2002 (Apr. 2, 2002), pp. 800-805, XP010590255, DOI: 10.1109/PCC.2002.997622, ISBN: 978-0-7803-7156-9.

(Continued)

*Primary Examiner* — Alex Torres-Rivera
(74) *Attorney, Agent, or Firm* — Laurence Greenberg; Werner Stemer; Ralph Locher (57) ABSTRACT

A converter arrangement includes a converter which can be switched between an AC voltage supply system and a DC voltage circuit and which has converter valves that extend between AC voltage connections and DC voltage connections. Each converter valve has a series connection of bipolar submodules that include power semiconductor devices. The converter arrangement further includes a star point reactor which is located on the AC voltage side of the converter and which has impedance coils that are interconnected to form a grounded neutral point. A suppression filter is connected between the neutral point and a ground connection. The suppression filter is configured to suppress a harmonic of an alternating voltage in the AC voltage supply system.

11 Claims, 4 Drawing Sheets

(51) Int. Cl.
   *H02M 7/219* (2006.01)
   *H02J 3/36* (2006.01)
   *H02M 7/483* (2007.01)

(56) References Cited

U.S. PATENT DOCUMENTS

| | | | |
|---|---|---|---|
| 7,489,485 B2* | 2/2009 | A F Klercker Alakula | H01F 27/38 |
| | | | 361/35 |
| 7,629,786 B2* | 12/2009 | Lee | H02J 3/01 |
| | | | 307/105 |
| 8,994,232 B2 | 3/2015 | Armschat et al. | |
| 10,135,329 B2* | 11/2018 | Li | H01F 38/14 |
| 2013/0070491 A1* | 3/2013 | Jiang-Hafner | H02J 3/36 |
| | | | 363/41 |
| 2014/0139167 A1 | 5/2014 | Steimer | |

FOREIGN PATENT DOCUMENTS

| | | |
|---|---|---|
| DE | 3545405 A1 | 7/1987 |
| DE | 102009034354 A1 | 1/2011 |

OTHER PUBLICATIONS

Barcenas E. et al: "Shunt Active Power Filters and Pwm Rectifiers in Three-Phase Three Wire Systems: A Survey", Applied Power Electronics Conference and Exposition, 2006, APEC '06, Twenty-First Annual IEEE March 19, 2006, Piscataway, NJ, USA, IEEE, Piscataway, NJ, USA, Mar. 19, 2006 (Mar. 19, 2006)), pp. 1307-1313, XP010910114, DOI: 10.1109/APEC.2006.1620708, ISBN: 978-0-7803-9547-3.

* cited by examiner

CONVERTER ARRANGEMENT COMPRISING A STAR POINT REACTOR

BACKGROUND OF THE INVENTION

Field of the Invention

The invention relates to a converter arrangement comprising a converter that can be connected between an alternating voltage grid and a direct voltage circuit and that has converter arms that extend between alternating voltage connections and direct voltage connections, each converter arm comprising a series circuit of two-pole submodules that comprise power semiconductors, the converter arrangement further comprising a star point reactor arranged on the alternating voltage side of the converter and having inductor coils that are interconnected to form a grounded neutral point.

Such a converter arrangement is known from DE 10 2009 034 354 A1. The known converter arrangement is used to enable a transfer of electrical energy between an alternating voltage grid and a direct voltage grid. The converter is connected for this purpose by means of the direct voltage connection to the direct voltage circuit or to a direct voltage line and by means of the alternating voltage connection to the alternating voltage grid. The converter arrangement can here, for example, be part of a high-voltage direct current transmission (HVDC) installation. The converter of the known converter arrangement is a so-called modular multilevel converter (MMC). Each converter arm of the MMC comprises a series circuit of two-pole submodules. The submodule in turn comprises power semiconductor switches and an energy store, usually in the form of a capacitor. The power semiconductor switches are connected to the energy store in such a way that, through suitable control of the power semiconductor switches, a voltage of zero or an energy store voltage dropped across the energy store can be generated at the poles or terminals of the submodule. The power semiconductor switches and the submodules can be controlled independently of one another, so that by means of the MMC a step-shaped converter alternating voltage can be generated on the alternating voltage side, with a step height essentially determined by the energy store voltage and the number of stages that can be created through the number of submodules of the power semiconductor valve. Due to the structure and the mode of operation of the MMC, poles of the direct voltage circuit can fundamentally have voltages of different magnitudes with respect to the ground potential. In an implementation as a so-called symmetrical monopole in particular, there is no fixed connection of the converter or of the direct voltage circuit to the ground potential. In such a case, contamination layer currents that flow to ground on the surfaces of insulators can bring about a resultant direct current to ground. This resultant direct current can have a disadvantageous effect on the alternating voltage side of the converter. In power transformers, for example, the direct current leads to a shift of the operating point in the magnetization characteristic. This shift can lead to increased noise emission and to a saturation of the power transformer when operating.

The star point reactor of the known converter arrangement is provided in order to symmetrize the voltages in the direct voltage circuit with respect to the ground potential. For this purpose the star point reactor is so designed that it represents a current path with a high impedance to the ground potential for alternating current with a fundamental oscillation frequency of the alternating voltage grid. At the same time the star point reactor provides a current path with a low impedance to the ground potential for a direct current. A potential connection of the converter arrangement to the ground potential is realized in this way. The known star point reactor is arranged here on the alternating voltage side parallel to the alternating voltage grid between the converter and a transformer. At the end that is remote from the neutral point each inductor coil of the star point reactor is connected, or can be connected through a switching unit, to a phase of the alternating voltage grid assigned to it. The alternating currents with the fundamental oscillating frequency of the alternating voltage grid, this fundamental oscillating frequency usually being 50 Hz or 60 Hz, cannot flow away via the star point reactor. The direct currents arising in the direct voltage circuit as a result of an asymmetry of the voltages, on the other hand, can flow away via the star point reactor and in that way symmetrize the direct current circuit.

SUMMARY OF THE INVENTION

The object of the present invention is to propose a converter arrangement of this general type in which a further improved avoidance of unwanted currents is possible.

The object is achieved according to the invention with a converter arrangement of this general type by a suppression filter which is arranged between the neutral point of the star point reactor and a ground connection, and which is designed to suppress a harmonic of an alternating voltage in the alternating voltage grid.

According to the invention a suppression filter that is arranged between the inductor coils and ground is thus provided. The suppression filter is designed so that at least one harmonic of the alternating voltage in the alternating voltage grid can be filtered out by means of the suppression filter. Harmonic refers here to any alternating voltage component of the alternating voltage in the alternating voltage grid, the frequency of which corresponds to a multiple of the fundamental frequency of the alternating voltage in the alternating voltage grid. The fundamental frequency here can usually be 50 Hz or 60 Hz.

An advantage of the converter arrangement according to the invention is the possibility of avoiding or at least minimizing unwanted currents in the alternating voltage grid that result from harmonic voltage components of the alternating voltage of the alternating voltage grid. The third harmonic, with three times the frequency of the alternating voltage, that is generated in the converter in some applications can, for example, be suppressed by the suppression filter. Such a third harmonic is often deliberately generated because a higher exploitation of a transformer secondary voltage can be achieved in that way, that is to say a converter-side voltage of a power transformer by means of which the converter is connected to the alternating voltage grid. A higher exploitation of the submodules of the converter is, moreover, thereby also enabled. If it is not suppressed, however, the third harmonic has a disadvantageous effect in the alternating voltage grid, because it can lead to a corresponding harmonic of the current.

The end of each inductor coil that is remote from the neutral point is expediently galvanically connected to an assigned phase of the alternating voltage grid. A galvanic isolation between the inductor coils or the neutral point of the star point reactor and the alternating voltage grid is, in particular, not necessarily provided, apart from possible switches.

The suppression filter preferably comprises a parallel resonant circuit with a capacitance and an inductance, wherein a resonant frequency of the parallel resonant circuit is matched to the frequency of the harmonic to be suppressed. The inductance is appropriately realized in the form of one or a plurality of inductor coils, and the capacitance in the form of one or a plurality of capacitors. The inductance L and the capacitance C are so designed that F=1/2*pi*sqrt (C*L) applies for the resonant frequency F of the suppression filter. The resonant frequency corresponds to the frequency of the harmonic that is to be suppressed.

According to one form of embodiment of the invention, the inductance is a primary winding of a suppression filter transformer, wherein a secondary winding of the suppression filter transformer is connected to an alternating voltage connection of a suppression filter converter, wherein the suppression filter converter is designed to generate an alternating voltage Uh at the alternating voltage connection, the frequency of which corresponds to the frequency of the harmonic that is to be suppressed. A DC flux in the iron core of the suppression filter transformer can be actively suppressed by means of the suppression filter converter. Any suitable medium-voltage converter can, for example, be used as the suppression filter converter. The alternating voltage Uh can be generated with an appropriate phase offset with respect to the harmonic of the alternating voltage in the alternating voltage grid that is to be suppressed. It is deemed particularly advantageous to design the suppression filter converter as a combination of an alternating voltage source and a direct voltage source. A DC flux in an iron core of the inductor of the suppression filter can thus be actively regulated to zero by means of the suppression filter converter. The star point reactor thus exhibits both a particularly low impedance for direct currents and a particularly high suppression capacity for the harmonic that is to be suppressed.

A transformation ratio Ü at the suppression filter transformer preferably lies between 1/1000 and 1/10. With such a transformation of the voltages at the suppression filter transformer, the suppression filter converter can, in particular, be designed for lower voltages, as a result of which it is particularly economical.

According to one form of embodiment of the invention, the suppression filter converter forms a full bridge circuit with four power semiconductors that can be switched off and a converter capacitor that are connected to the converter capacitor in such a way that a capacitor voltage dropped across the converter capacitor, a zero voltage, or, however, the inverse capacitor voltage can be generated at the alternating voltage connection of the suppression filter converter. With a suitable drive, for example by means of pulse-width modulation, a preferred alternating voltage Uh can be generated at the alternating voltage connection of the suppression filter converter.

The star point reactor can, for example, be arranged between a transformer arranged at the alternating voltage side of the converter and the alternating voltage connection of the converter. The inductor coils here can be connectable directly to the phases of the alternating voltage line assigned to them, parallel to the transformer.

A compensation winding is preferably assigned to each inductor coil of the star point reactor, wherein the compensation windings are arranged in an electrical series circuit between the neutral point and ground or the suppression filter, wherein the compensation windings and the inductor coils have a common coil core, wherein the suppression filter is arranged between the series circuit of the compensation windings and the ground connection. The impedance with respect to the fundamental oscillation frequency of the alternating voltage grid can be increased further by the compensation windings. The number of turns of the compensation windings can here, for example, be ⅓ of the number of turns of the inductor coils. This form of embodiment of the invention has the advantage that the star point reactor has a relatively low zero-sequence impedance in normal operation, and a high zero-sequence impedance in the event of a fault on the direct voltage side.

In some applications it is advantageous if a transformer is arranged on the alternating voltage side of the converter. The transformer comprises windings on the grid side as well as the converter side, and connects the converter to a grid side alternating voltage grid. The grid-side windings can, for example, be arranged as a star, and the converter-side windings, for example, in a delta or star arrangement. The neutral point of the converter-side star arrangement can be grounded. The direct current resulting from asymmetry in the direct voltage circuit (also known as ground current) can have the result of a disadvantageous magnetic bias in the transformer in this case.

According to one form of embodiment of the invention, the inductor coils of the star point reactor are designed as converter-side windings of the transformer that is arranged on the alternating voltage side of the converter. The compensation windings are also designed as tertiary windings of the transformer, wherein a winding direction of the compensation windings is opposite to a winding direction of the associated inductor coils, and the transformer and the star point reactor have a common coil core. The common coil core accordingly passes through both the grid-side and the converter-side windings of the transformer as well as the compensation windings. The resulting direct current in the converter arrangement flows, according to this form of embodiment, in a distributed manner through the converter-side windings of the transformer and, in total, through the compensation windings. Due to the compensation windings being oriented in the opposite sense, a magnetic tension arising in the coil core is compensated for. The magnetic bias of the transformer described previously is advantageously avoided in this way. A reduction in disturbing noises in the transformer also results from this effect.

According to a further form of embodiment of the invention, the star point reactor is arranged between a transformer that is arranged on the alternating voltage side of the converter and the alternating voltage connection of the converter, wherein a winding direction of the compensation windings and the inductor coils is the same. According to this form of embodiment, the compensation windings form a series circuit that is connected at one end to the neutral point of the star point reactor and at the other end to a ground connection. The winding direction of each compensation winding is the same as the winding direction of the associated inductor coil. The advantages of this arrangement are a particularly high zero-sequence impedance in normal operation and a low zero-sequence impedance in the event of a fault on the direct voltage side. Air gaps can also be introduced here into each iron leg of the common coil core to specifically determine the zero-sequence inductance and the saturation point. The third harmonic can furthermore be efficiently suppressed at the neutral point of the three main windings.

The star point reactor preferably comprises an overvoltage arrester that is connected between the neutral point and ground, in parallel with the compensation windings or the suppression filter. This overvoltage arrester ensures that the voltage is limited in the event of a fault.

According to one variant embodiment of the invention, each submodule comprises a full bridge circuit with four power semiconductors that can be switched off and an energy store that are connected to the energy store in such a way that an energy store voltage dropped across the energy store, a zero voltage, or, however, the inverse energy store voltage can be generated at output terminals of the submodule.

According to a further variant embodiment, each submodule comprises a half bridge circuit with two power semiconductors that can be switched off and an energy store that are connected to the energy store in such a way that an energy store voltage dropped across the energy store or a zero voltage can be generated at output terminals of the submodule.

It is equally conceivable for some submodules of the converter to comprise half bridge circuits and some other submodules of the converter to comprise full bridge circuits. It should be noted here that the application of the invention is not limited to modular multilevel converters. It is, for example, conceivable that the submodules each comprise a power semiconductor that can be switched on and off and an anti-parallel freewheeling diode. In this case the converter is designed as a link converter comprising a DC link circuit in which a link circuit capacitor is arranged.

BRIEF DESCRIPTION OF THE SEVERAL VIEWS OF THE DRAWING

The invention is further explained below with reference to FIGS. 1 to 3.

DESCRIPTION OF THE INVENTION

Figure 1:
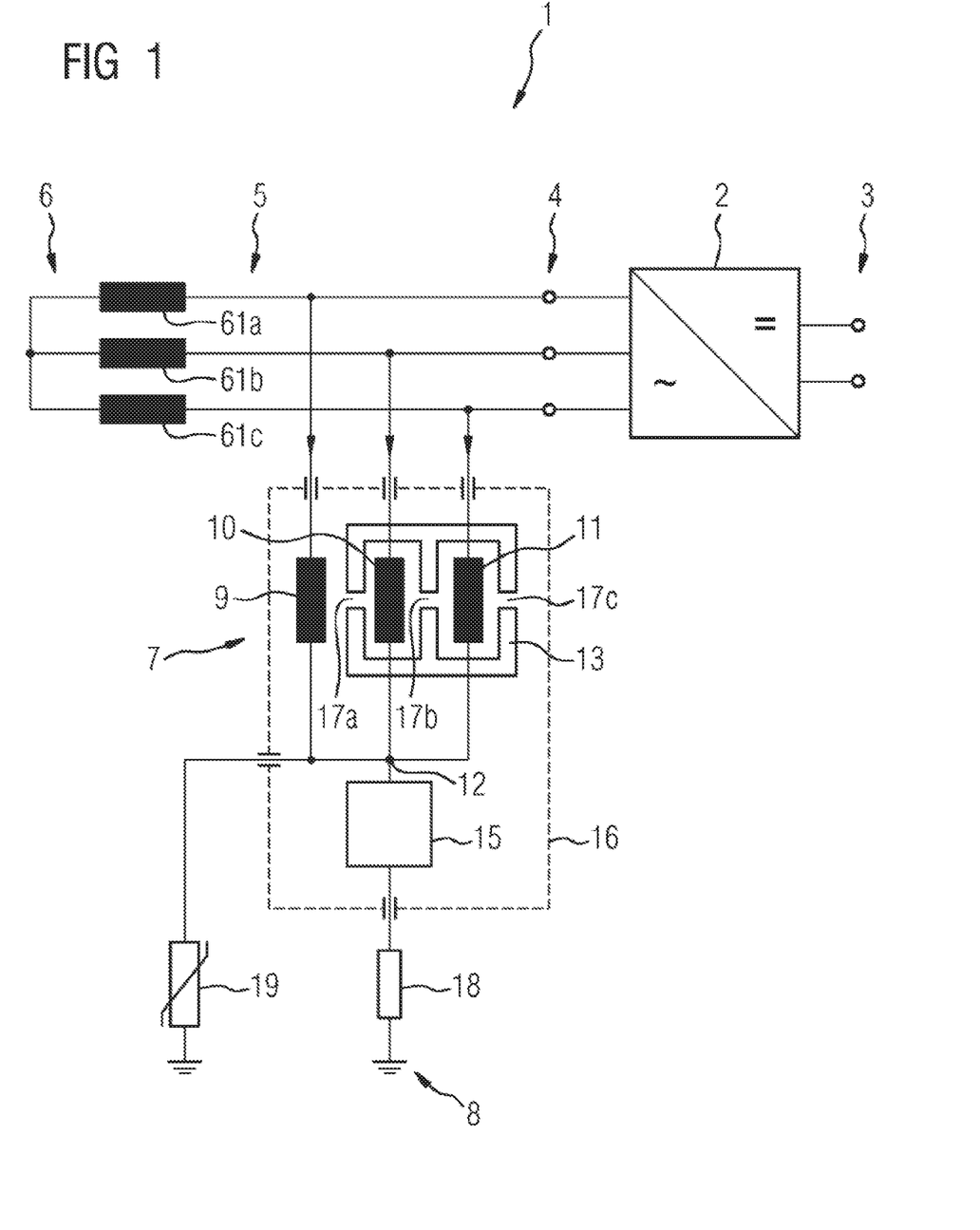
FIG. 1 shows a schematic illustration of a first exemplary embodiment of a converter arrangement according to the invention.

In detail, a converter arrangement 1 is shown in FIG. 1. The converter arrangement 1 comprises a converter 2. The converter 2 comprises a direct voltage side that can be connected to a direct voltage circuit, for example a DC link circuit of an HVDC installation or a direct voltage grid by means of a direct voltage connection 3. The converter 2 further comprises an alternating voltage side that can be connected by means of an alternating voltage connection 4 to an alternating voltage grid 5 which, in the present example, has three phases. The connection to the alternating voltage grid 5 is made through a transformer 6 in the exemplary embodiment illustrated in FIG. 1. The transformer 6 comprises grid-side windings (not shown in the drawing FIG. 1) and converter-side windings 61a-c on the side of the transformer 6 close to the converter 2. The converter-side windings are each connected to one another in a star circuit. The grid-side windings are, for example, also connected to one another in a star circuit. In principle, however, any other suitable configuration of the transformer is also possible, for example a star-delta configuration.

Between the transformer 6 and the converter 2 a star point reactor 7 is arranged, connected in parallel with the alternating voltage grid 5, or between the phases of the alternating voltage grid 5 and a ground connection 8.

The star point reactor 7 comprises a first inductor coil 9, a second inductor coil 10 and a third inductor coil 11. Each inductor coil 9-11 is galvanically connected to its associated phase of the alternating voltage grid 5. At the end that is remote from the alternating voltage grid 5, the inductor coils 9-11 are connected together to form a common neutral point 12. The three inductor coils 9-11 have a common coil core 13. A partial core of the common coil core 13 here passes through each inductor coil 9, 10 or 11. Each partial core has an air gap 17a-c, whose function is to adjust a saturation characteristic or a saturation point of the inductors 9-11.

A suppression filter 15 is arranged between the common neutral point 12 and the ground terminal or the ground connection 8. The structure of the suppression filter 15 is considered in more detail below in connection with FIG. 3.

The inductor coils 9-11 and the suppression filter 15 are arranged in a common housing 16 that provides, for example, an oil insulation, an $SF_6$ insulation, an ester insulation or the like.

There is a resistor element 18 that serves for current limitation connected in series with the suppression filter 15. An overvoltage arrester 19 for voltage limitation is arranged in parallel with the series circuit of the suppression filter 15 and the resistor element 18.

Figure 2:
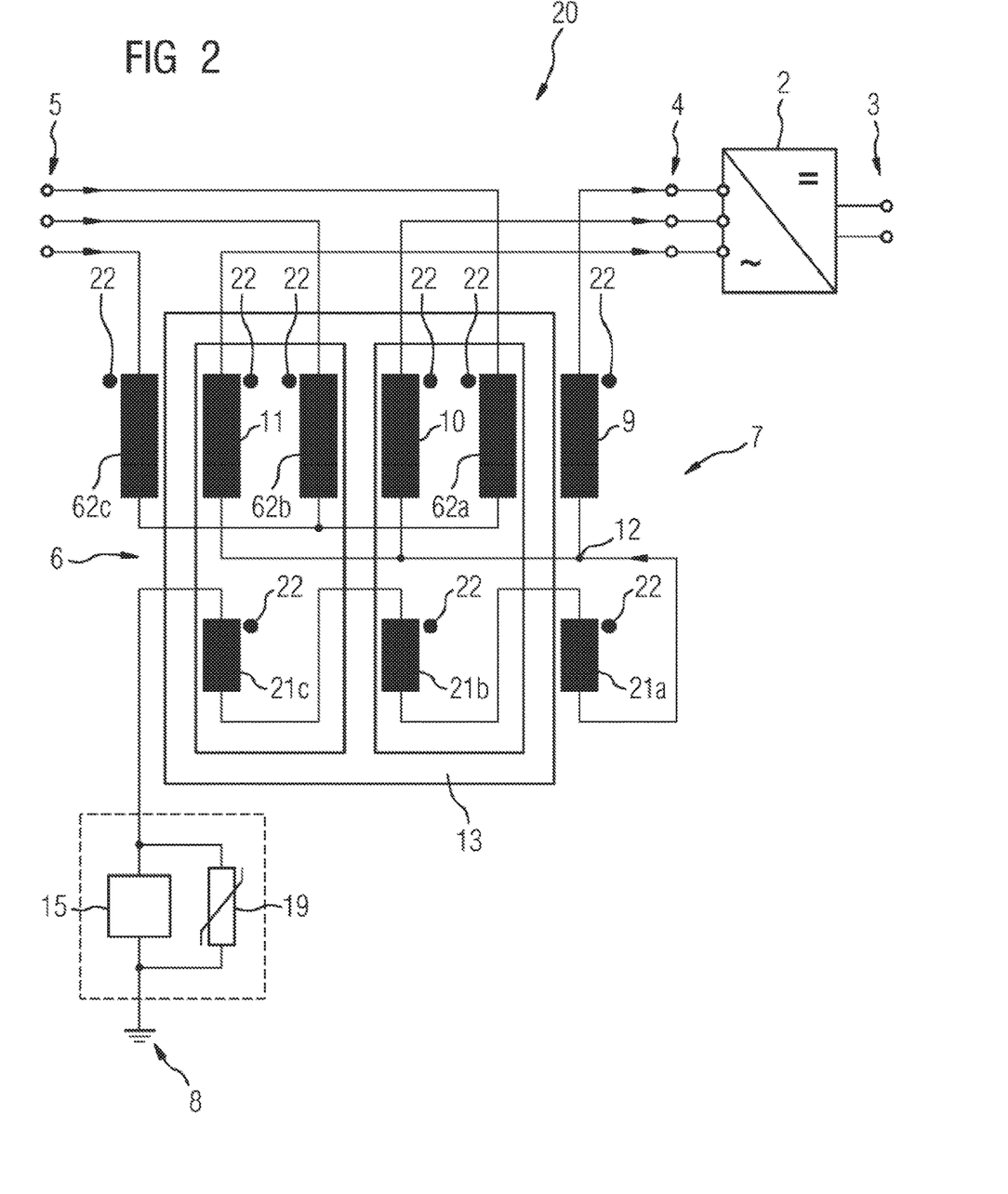
FIG. 2 shows a schematic illustration of a second exemplary embodiment of a converter arrangement according to the invention.

FIG. 2 shows a converter arrangement 20. Elements of the converter arrangements 1 or 20 that are the same or of the same type have been given the same reference signs in FIGS. 1 and 2.

The converter arrangement 20 comprises a converter 2. The converter 2 comprises a direct voltage side that can be connected to a direct voltage circuit, for example a DC link circuit of an HVDC installation or a direct voltage grid by means of a direct voltage connection 3. The converter 2 further comprises an alternating voltage side that can be connected by means of the alternating voltage connection 4 to a three-phase alternating voltage grid 5. The connection to the alternating voltage grid 5 is made through a transformer 6 in the exemplary embodiment illustrated in FIG. 2.

Between the transformer 6 and the converter 2 a star point reactor 7 is arranged, connected in parallel with the alternating voltage grid 5, or between the phases of the alternating voltage grid 5 and a ground connection 8. The star point reactor 7 comprises three inductor coils 9-11. At the end that is remote from the alternating voltage grid 5, the inductor coils 9-11 are connected together to form a common neutral point 12.

In contrast to the implementation of the converter arrangement 1 of FIG. 1, the inductor coils 9-11 of the converter arrangement 20 are implemented as converter-side or secondary-side windings of the transformer 6. The transformer 6, furthermore, comprises grid-side or primary-side windings 62a-c. A first compensation winding 21a is assigned to the first inductor coil 9, a second compensation winding 21b to the second inductor coil 10 and a third compensation winding 21c to the third inductor coil 11. The compensation windings 21a-c are arranged in a series circuit between the common neutral point 12 and the ground connection 8. It can be seen that the common coil core 13 of the transformer 6 also passes through the compensation windings 21a-c. The winding direction of the compensation windings 21a-c of the converter arrangement 20 is opposite to the winding direction of the inductor coils 9-11. The winding direction of coils is suggested here in FIG. 2 by respective dots 22. A compensation of the magnetization of the coil core 13 is achieved through the opposed winding, whereby a magnetic bias of the transformer 6 can be avoided.

A suppression filter 15 is arranged between the common neutral point 12 and the ground terminal or the ground connection 8. The structure of the suppression filter 15 is considered in more detail below in connection with FIG. 3.

An overvoltage arrester 19 is arranged parallel to the suppression filter 15 for voltage limitation.

Figure 3:
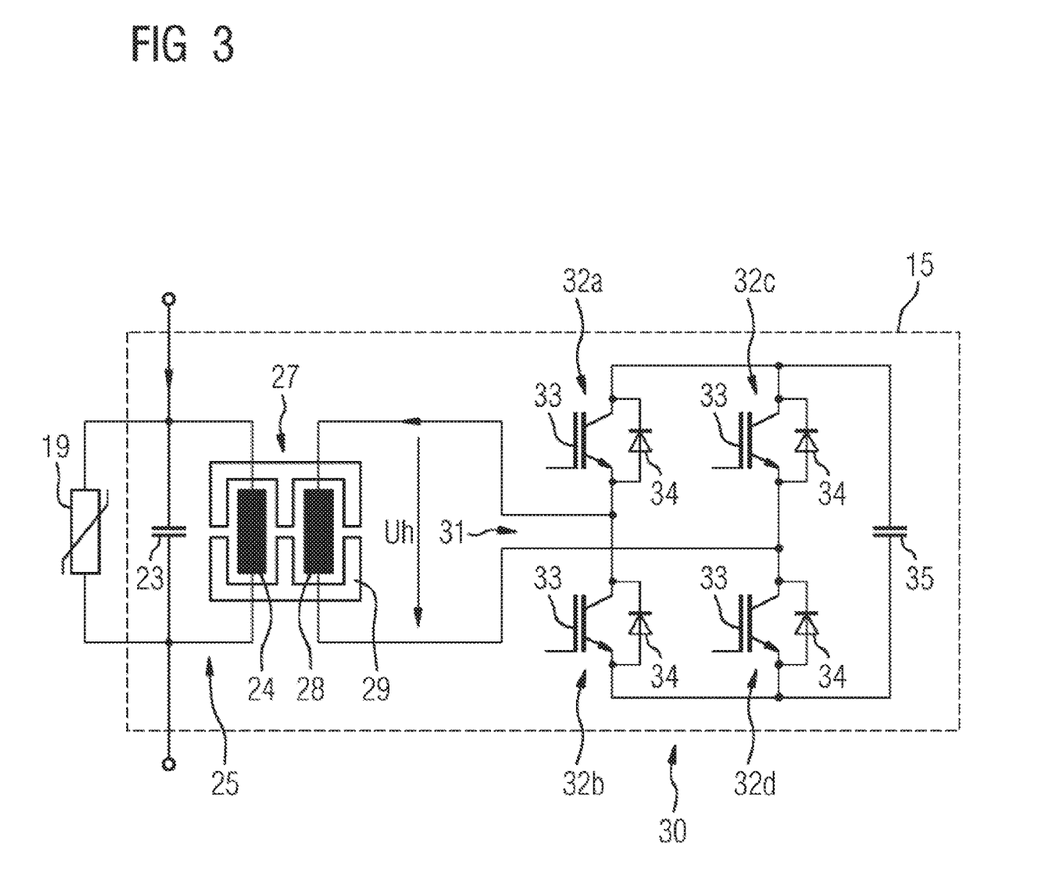
FIG. 3 shows a schematic illustration of an example of a suppression filter of the converter arrangements of FIGS. 1 and 2.

FIG. 3 shows a suppression filter 15 that can, for example, be used in one of the converter arrangements 1 or 20 of FIGS. 1 and 2.

The suppression filter 15 comprises a parallel resonant circuit 25 having a capacitance 23 and an inductance 24. The capacitance 23 and the inductance 24 are arranged in such a way that the resonant frequency of the parallel resonant circuit 25 corresponds to the third harmonic of the alternating voltage in the alternating voltage grid 5. The inductance 24 here is a primary winding of a suppression filter transformer 27 with a secondary winding 28 and a transformation ratio from the secondary side to the primary side of 1:100. The primary winding 24 and the secondary winding 28 are penetrated by a common iron core 29 with an air gap.

The suppression filter transformer 27 is connected on the secondary side to a suppression filter converter 30. The suppression filter converter 30 comprises an alternating voltage connection 31 for connecting to the suppression filter transformer 27. The suppression filter converter 30 further comprises a first switching unit 32a, a second switching unit 32b, a third switching unit 32c and a fourth switching unit 32d. Each of the switching units 32a-d comprises for its part a power semiconductor switch 33 that can be switched on and off as well as an antiparallel freewheeling diode 34. An energy store 35 is arranged parallel to the switching units 32a-b or 32c-d. The suppression filter converter 30 thus constitutes a full bridge circuit. A voltage Uh with the frequency of the third harmonic that is to be suppressed can be generated at the alternating voltage connection 31 by means of an appropriate control of the switching units 32a-d.

Figure 4:
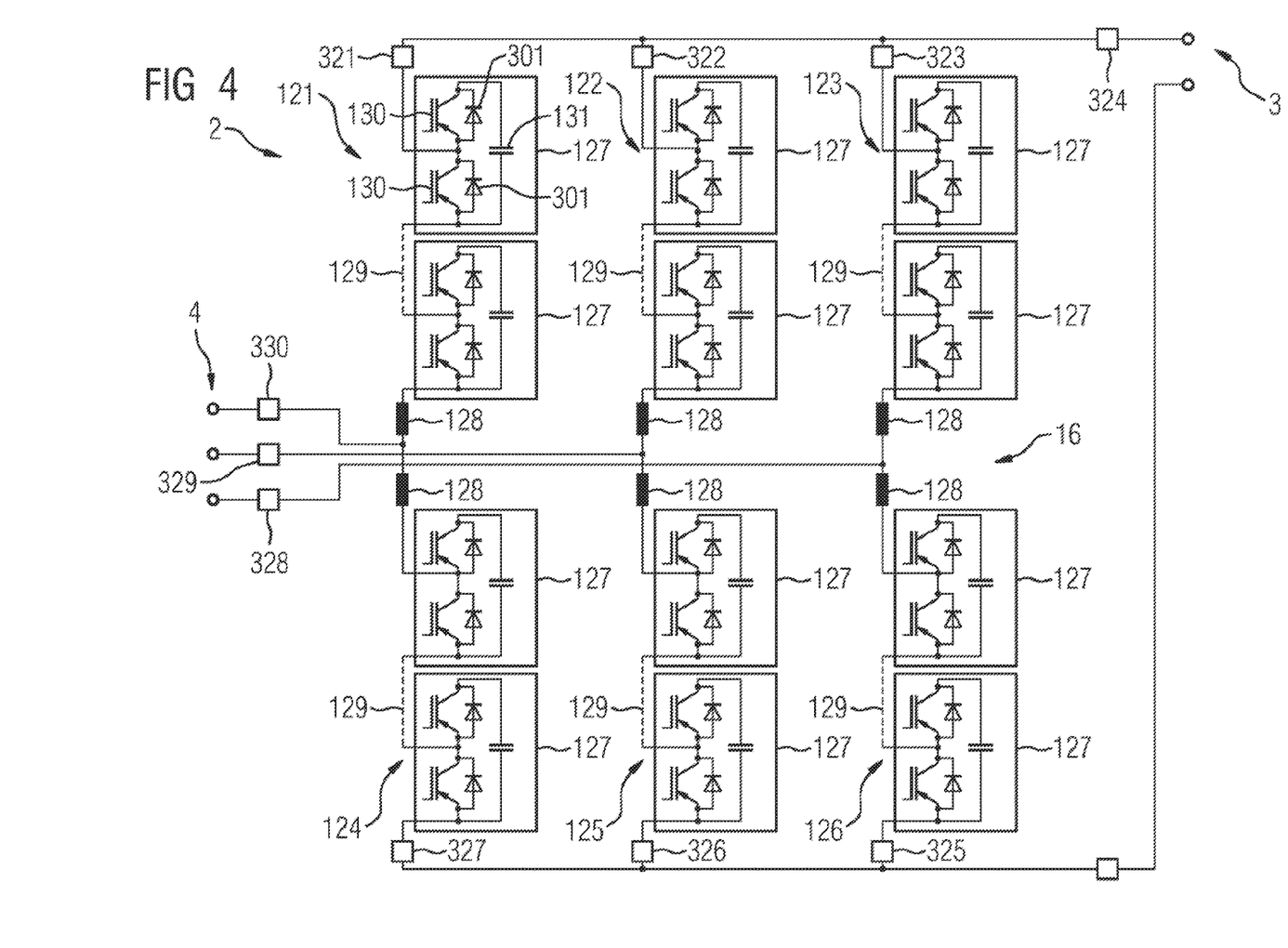
FIG. 4 shows an example of a converter for one of the converter arrangements of FIGS. 1 to 3.

A converter 2 for one of the converter arrangements of FIGS. 1 to 3 is illustrated in FIG. 4. The converter 2 is connected between an alternating voltage connection 4 and a direct voltage connection 3. The converter 2 can thus be connected on the direct voltage side with a direct voltage line or a direct voltage grid, and on the alternating voltage side with an alternating voltage grid. The converter 2 is a modular multilevel converter (MMC). The MMC comprises power semiconductor valves 121-126 arranged between the direct voltage side and the alternating voltage side.

Each power semiconductor valve 121-126 comprises a series circuit of two-pole submodules 127 and a smoothing choke 128. All the submodules 127 in the exemplary embodiment illustrated in FIG. 2 have the same construction, although this is not in general necessary. It is suggested in FIG. 4 by means of broken lines 129 that each power semiconductor valve 121-126 can comprise a larger number of submodules 127 than the two submodules 127 illustrated explicitly in FIG. 4.

Each submodule 127 comprises two semiconductor switches 130, each of which has a freewheeling diode 301 connected in antiparallel, and an energy store in the form of a capacitor 131. The submodules 127 are thus designed as half bridge circuits. The semiconductor switches 130 of the submodules 127 can be controlled independently of one another.

Instead of the half bridge circuits, the submodules can also, for example, be realized as full bridge circuits known to the expert.

The converter 2 further comprises measurement devices 321-330 that are designed to measure currents and/or voltages.

A control unit, not illustrated explicitly in FIG. 4, for regulating the converter 2 is also provided.

The invention claimed is:

1. A converter arrangement, comprising:
a converter to be connected between an alternating voltage grid and a direct voltage circuit, said converter having converter arms that each extend between an alternating voltage connection and a direct voltage connection, each of said converter arms having a series circuit of two-pole submodules that include power semiconductors;
a star point reactor connected at an alternating voltage side of said converter and including inductor coils that are connected to form a grounded neutral point; and
a suppression filter connected between said neutral point and a ground connection, said suppression filter being configured to suppress a harmonic of an alternating voltage of the alternating voltage grid;
said suppression filter having a parallel resonant circuit with a capacitance and an inductance, with a resonant frequency of said parallel resonant circuit being matched to a frequency of the harmonic to be suppressed;
said inductance being a primary winding of a suppression filter transformer, said suppression filter transformer having a secondary winding connected to an alternating voltage connection of a suppression filter converter; and
said suppression filter converter being configured to generate an alternating voltage at the alternating voltage connection, the alternating voltage having a frequency corresponding to the frequency of the harmonic to be suppressed.

2. The converter arrangement according to claim 1, wherein each inductor coil has an end that is remote from said neutral point and is galvanically connected to a respectively assigned phase of the alternating voltage grid.

3. The converter arrangement according to claim 1, wherein a transformation ratio (Ü) at said suppression filter transformer lies between 1:1000 and 1:10.

4. The converter arrangement according to claim 1, wherein said suppression filter converter forms a full bridge circuit with at least four power semiconductors that can be switched off and a converter capacitor, said power semiconductors being connected to said converter capacitor in such a way to enable the alternating voltage connection of said suppression filter converter to carry either a capacitor voltage dropping across said converter capacitor, a zero voltage, or an inverse of the capacitor voltage.

5. The converter arrangement according to claim 1, wherein said star point reactor is connected between a transformer that is connected at the alternating voltage side of said converter and an alternating voltage connection of said converter.

6. The converter arrangement according to claim 1, wherein:
a compensation winding is assigned to each inductor coil of said star point reactor;
said compensation windings are arranged in an electrical series circuit between said neutral point and the ground connection;
said compensation windings and said inductor coils have a common coil core; and said suppression filter is arranged between said series circuit of said compensation windings and the ground connection.

7. The converter arrangement according to claim 6, wherein said inductor coils of said star point reactor are converter-side windings of a transformer that is arranged on the alternating voltage side of said converter, and said compensation windings are tertiary windings of said transformer, wherein a winding direction of said compensation windings is the opposite to a winding direction of the respectively assigned inductor coils, and said transformer and said star point reactor comprise a common coil core.

8. The converter arrangement according to claim 6, wherein said star point reactor is arranged between a transformer arranged on the alternating voltage side of said converter and the alternating voltage connection of said converter, and wherein said compensation windings and said inductor coils have a common winding direction.

9. The converter arrangement according to claim 1, wherein said star point reactor comprises an overvoltage arrester that is connected between said neutral point and the ground connection in parallel with said suppression filter.

10. The converter arrangement according to claim 1, wherein each of said submodules comprises a full bridge circuit with four power semiconductors that can be switched off and an energy storage device, wherein said power semiconductors are connected to said energy storage device in such a way to generate at output terminals of said submodule either an energy store voltage dropped across the energy storage device, a zero voltage, or an inverse energy store voltage.

11. The converter arrangement according to claim 1, wherein each of said submodules comprises a half bridge circuit with two power semiconductors that can be switched off and an energy storage device, wherein said semiconductors are connected to said energy storage device in such a way to generate at output terminals of said submodule an energy store voltage dropped across the energy storage device or a zero voltage.

* * * * *